Patented Aug. 28, 1928.

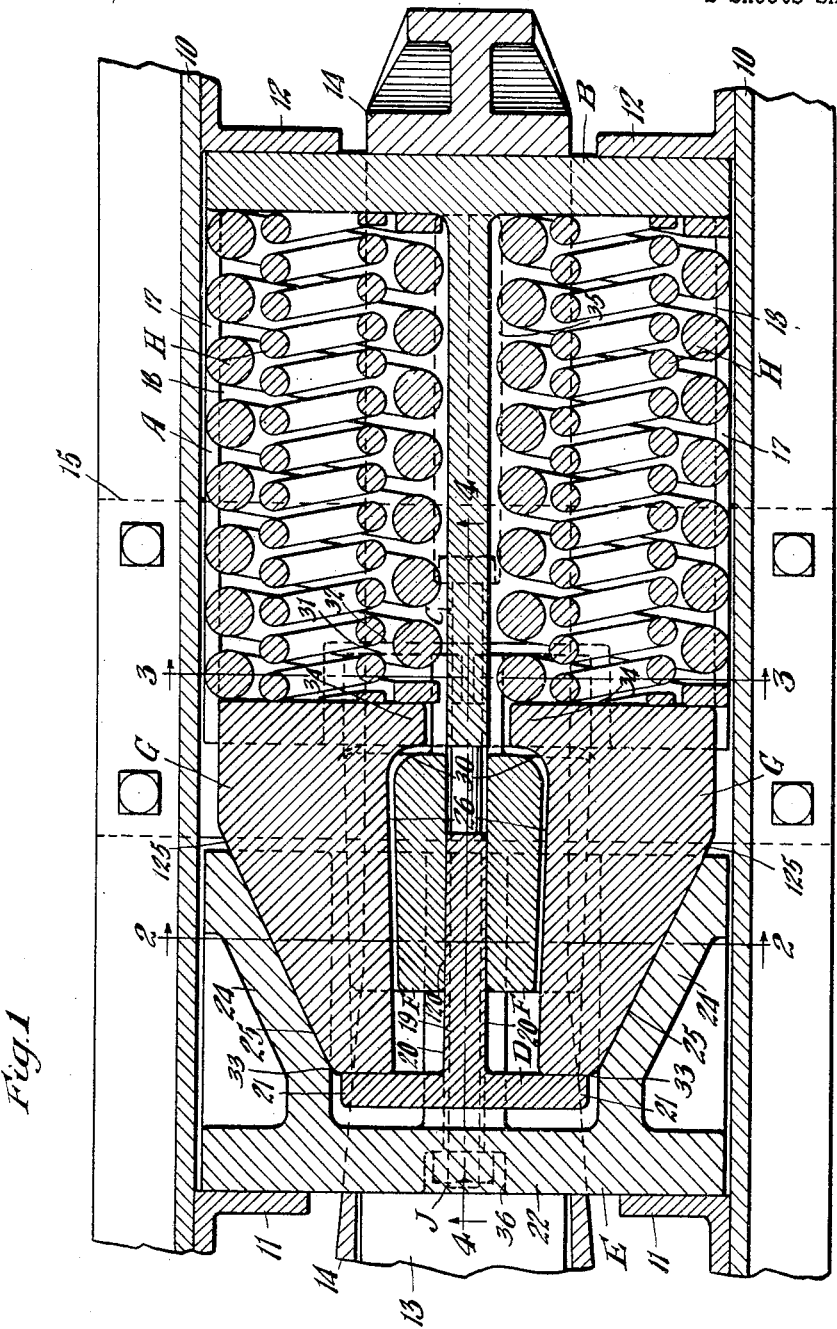

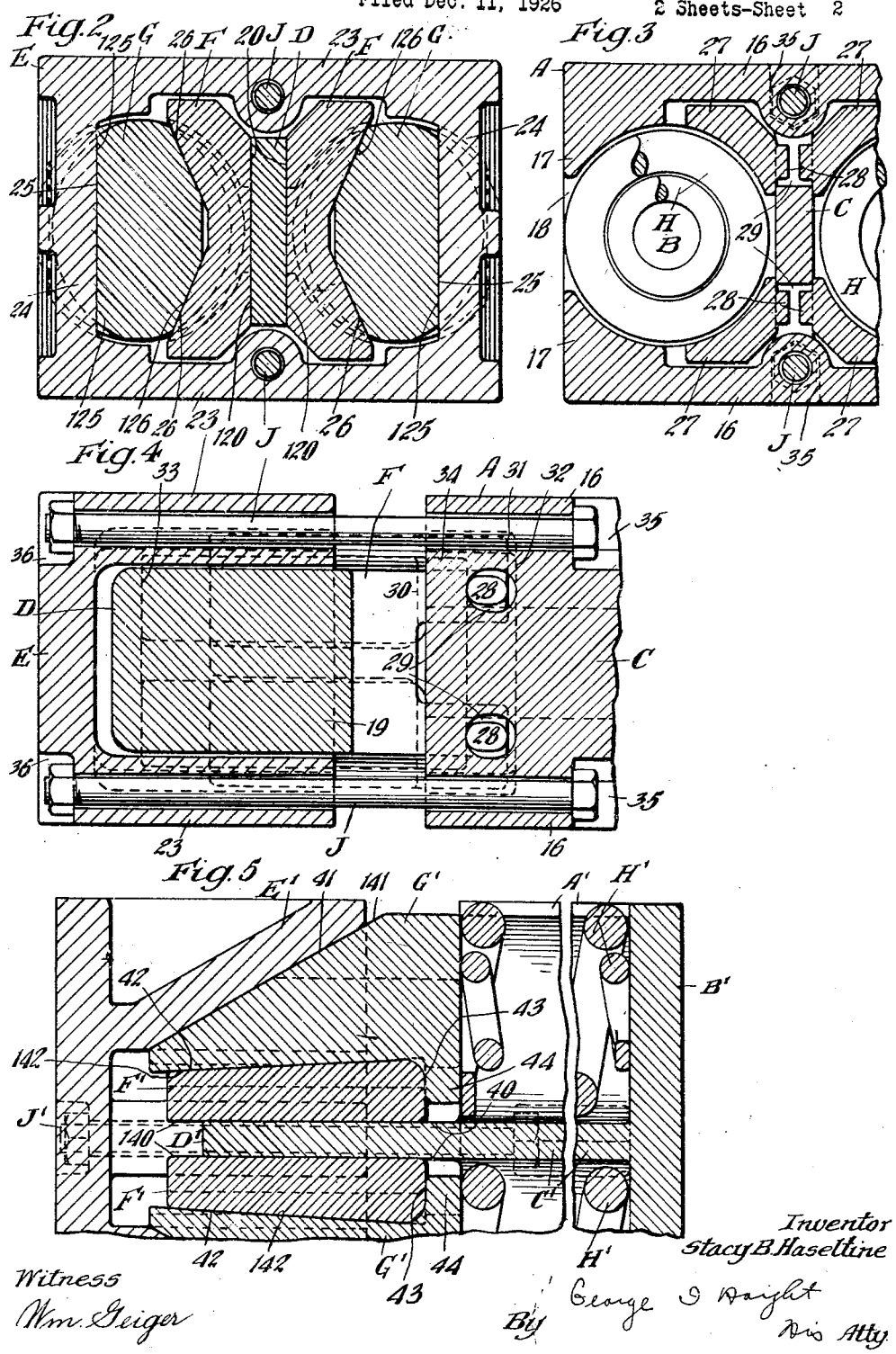

1,682,042

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed December 11, 1926. Serial No. 154,077.

This invention relates to improvements in friction shock absorbing mechanisms.

One object of the invention is to provide a friction shock absorbing mechanism especially adapted for railway draft riggings having great column strength, together with graduated action and ultimate high capacity.

Another object of the invention is to provide a friction shock absorbing mechanism of the character indicated, having initial free spring action followed by two stages of increased frictional resistance to provide ultimate high capacity.

A more specific object of the invention is to provide a friction shock absorbing mechanism of the character indicated, including a friction system initially movable as a unit opposed by spring resistance means to provide for initial spring action, wherein relative movement of certain of the friction elements is effected after said preliminary action to provide heavier frictional resistance, and wherein relative movement of all of the friction elements is provided at a subsequent stage of the operation to produce high capacity.

Other and further objects of the invention will more fully and clearly appear from the description and claims hereinafter following.

In the drawings, forming a part of this specification, Figure 1 is a longitudinal, horizontal, sectional view of a portion of a railway draft rigging showing one embodiment of my invention in connection therewith. Figures 2 and 3 are transverse, vertical, sectional views corresponding respectively to the lines 2—2 and 3—3 of Figure 1, Figure 3 being partly broken away. Figure 4 is a vertical, longitudinal, sectional view of the front end of the mechanism illustrated in Figure 1, corresponding substantially to the line 4—4 of Figure 1. Figure 5 is a horizontal, sectional view, partly broken away, similar to Figure 1, illustrating another embodiment of my invention.

In said drawings, referring first to the embodiment of the invention illustrated in Figures 1 to 4, inclusive, 10—10 indicate channel-shaped center or draft sills of a railway car underframe, to the inner faces of which are secured front stop lugs 11—11 and rear stop lugs 12—12. The inner end of the drawbar is designated by 13, to which is operatively connected a yoke 14 of well-known form. The shock absorbing mechanism proper is disposed within the yoke, and the yoke and the parts therewithin are supported in operative position by a detachable saddle plate 15 secured to the draft sills.

My improved shock absorbing mechanism proper, as illustrated in Figures 1 to 4, inclusive, comprises broadly, a spring cage A, including a rear follower B and a partition C forming a section of a friction post; a movable friction post section D; a wedge casing E; two friction elements F—F; two wedge friction shoes G—G; twin arranged main spring resistance means H; and a pair of retainer bolts J.

The cage A is in the form of a substantially rectangular box-like casting having a transverse end wall forming the rear follower B, top and bottom walls 16—16 and side walls 17—17. As most clearly shown in Figures 1 and 3, the side walls 17 are open between the top and bottom thereof to provide longitudinal slots 18—18 to accommodate the outer sides of the two twin arranged springs, thereby permitting the use of the maximum diameter of spring coils. As clearly shown in Figure 3, the walls of the cage are relatively thick, and the inner surfaces thereof are curved to closely conform to the contour of the spring coils, thereby providing a column element of exceptionally great strength.

The partition C is formed integral with the top and bottom and rear end walls of the spring cage, and the side faces of the partition are curved to conform substantially to the contour of the spring coils, thereby further strengthening the structure of the cage. As most clearly shown in Figure 1, the forward end of the partition C is cut away so as to provide flat vertically disposed faces for a purpose hereinafter described. The friction post section or partition C terminates flush with the outer end of the cage, as shown in Figure 1.

The movable friction post section D comprises a T-shaped element having a vertically disposed plate-like section 19 provided with longitudinally disposed flat friction surfaces 20—20 on the opposite sides thereof. At the forward end, the plate-like section 19 is provided with lateral flanges 21—21 forming the T-head of the friction post section D. As shown in Figure 1. The T-head is normally spaced from the end wall of the casing E to provide for a certain amount of relative movement.

The wedge casing E is in the form of a hollow, box-like member having a transverse front end wall 22 co-operating with the stop lugs 11 in the manner of the usual front follower. The casing E is also provided with horizontally disposed flat top and bottom walls 23—23 and rearwardly diverging side walls 24—24. The side walls 24 present rearwardly diverging interior flat wedge faces 25—25 which co-operate with the friction shoes G.

The friction elements F are two in number and are disposed at opposite sides of the friction post section D. Each of the friction elements F has a longitudinally disposed flat friction surface 120 on the inner side thereof adapted to co-operate with the corresponding friction surface 20 of the friction post section D. On the outer side, each friction element F is also provided with longitudinally disposed, inclined V-shaped friction surfaces 26—26 adapted to co-operate with the friction shoes. At the inner ends, the friction elements F are provided with top and bottom extensions or arms 27, each provided with a laterally inwardly projecting lug 28 adapted to engage within a recess 29 at the front end of the partition C. As most clearly shown in Figure 4, the recesses 29 are of greater length than the lugs 28, thereby permitting a certain amount of lost motion, the lost motion being sufficient to permit the required movement of the friction elements F during compression of the mechanism. At the junction of the arms and the friction elements F, the latter are provided with vertically disposed flat abutment faces 30 adapted to co-operate with the friction shoes in a manner hereinafter described. The inner ends of the arms 27 also present flat end abutment surfaces 31 which are adapted to co-operate with abutment surfaces 32 on the spring cage. Upon reference to Figure 1, it will be noted that in the normal position of the parts, the abutment faces 31 are spaced slightly from the abutment faces 32, thereby providing for a predetermined preliminary movement of the friction elements F with respect to the cage A. As most clearly shown in Figure 3, the arms 27 of the friction elements are cut away to provide curved surfaces corresponding in contour to the spring coils. By this arrangement, arms are provided which are of maximum strength.

The wedge friction shoes G are two in number, and are disposed at opposite sides of the friction elements F. Each friction shoe G has a longitudinally disposed V-shaped friction surface 126 on the inner side thereof co-operating with the corresponding friction surface 26 on the friction element and at the same side of the mechanism. Each friction shoe is also provided with an outer wedge face 125 at the forward end thereof adapted to co-operate with the corresponding wedge face of the wedge casing E. At the forward end, each shoe G has a flat abutment face 33 adapted to bear on the inner side of the corresponding flange 21 of the T-shaped friction post section D. At the rear end, each shoe is provided with a lateral inward projection 34 normally slightly spaced from the abutment face 30 of the corresponding friction element F. The enlargement on the shoes provides for proper bearing for the ends of the springs. The abutment faces at the outer ends of the friction shoes G co-operate with the T-head of the friction post D to restore the same to normal position.

The main spring resistance elements H comprise twin arranged sets, each set comprising a relatively heavy outer coil and a lighter inner coil having their front and rear ends bearing respectively on the inner end of the corresponding friction shoe G and the inner surface of the transverse rear end wall B of the spring cage.

The mechanism is held of overall uniform length by the retainer bolts J which are two in number and are disposed at the top and bottom of the gear. The post section or partition C of the spring cage is recessed at the top and bottom as indicated at 35 to accommodate the heads of the bolts J for longitudinal movement during compression of the mechanism. The partition C and the wedge casing E are provided with aligned openings adapted to accommodate the shanks of the bolts J, the heads of the bolts being accommodated in recesses 36 at the forward end of the wedge casing E. The retainer bolts not only serve to maintain the mechanism of uniform overall length and hold the parts assembled, but also serve to hold the entire mechanism under a predetermined initial compression. Wear of the various friction and wedge faces is compensated for by expansion of the main springs which, as hereinbefore pointed out, are under initial compression.

The operation of my improved shock absorbing mechanism, as illustrated in Figures 1 to 4, inclusive, during a compression stroke, on either buff or draft of the mechanism, is as follows: The wedge casing E and the spring cage A will be moved toward each other, thereby forcing the wedge friction shoes G inwardly of the mechanism and also laterally toward each other. Due to the wedging action between the casing E and the shoes, the latter will be forced into intimate contact with the friction surfaces of the friction elements F and the latter will be forced into tight frictional engagement with the friction post section D. Due to the friction existing between these parts, the same will initially move in unison inwardly of the mechanism, effecting only compression of the spring resistance elements H. This initial action will continue until the inner ends of the arms 27 of the friction elements F come into engagement with the abutment faces at the forward end of the cage, whereupon the movement of the friction elements F will be arrested. During the continued inward movement of the casing E with reference to the cage A and the friction shoes G moving therewith, the friction shoes G will be forced to slip on the friction elements F, the latter being held stationary as hereinbefore pointed out. Due to the friction created between the shoes G and the friction elements F, the resistance offered by the mechanism will be greatly increased during this second stage of operation. As the movement of the friction shoes inwardly of the mechanism with reference to the friction elements F continues, the clearance between the end wall of the casing E and the T-head of the movable friction post section D will be taken up and the post carried inwardly in unison with the outer parts, thereby setting up additional frictional resistance between the friction surface of the post section D and the friction elements F.

This action will continue either until the actuating force is reduced, or the inner end of the post section comes into engagement with the partition wall C of the spring cage. Simultaneously with the engagement of the friction post section D with the partition of the cage A, the rear faces of the flanges 21 of the post section D engage the front end faces of the friction elements F and the rear end of the casing E will engage the front end of the cage A, the cage, partition wall thereof, friction post section D and casing E and the friction elements F together forming a solid column to transmit the actuating force to the stop lugs of the draft sills and prevent the springs from being unduly compressed.

In release, when the actuating force is reduced, expansion of the springs H will force the friction shoes outwardly, carrying the friction post section D therewith, the T-head of the latter being engaged by the front ends of the shoes. Due to the friction existing between the friction shoes G and the friction elements F, the latter will be carried outwardly with the friction shoes and restored to normal position. In case the friction elements F are not carried outwardly by the shoes in the manner described, the lateral enlargements 34 of the shoes will engage the abutment faces 30 on the friction elements and positively carry the same forwardly. Outward movement of the friction elements F is arrested by the lugs 28 thereof coming into engagement with the outer end walls of the recesses 29 on the partition C. Outward movement of the wedge casing E will in turn be limited by the retainer bolts J.

Referring next to the embodiment of the invention illustrated in Figure 5, the same comprises a spring cage A' provided with a transverse end wall B' forming the rear follower element of the mechanism, and a partition wall C' forming a post section; a wedge casing E'; two friction elements F'; two wedge friction shoes G'; two twin arranged main spring resistance elements H'; and a pair of retainer bolts J'.

The arrangement of spring cage is substantially the same as that hereinbefore described with the exception that the partition wall C' extends forwardly beyond the front ends of the top and bottom walls of the cage, thereby presenting a friction post section D' at the forward end thereof. The friction post section D' is provided with longitudinally disposed friction surfaces 40 on the opposite sides thereof cooperating with longitudinally disposed friction surfaces 140—140 on the inner sides of the friction members F'. The arrangement of twin springs is similar to that described in connection with that of the first embodiment of the invention, the springs cooperating with the rear ends of the friction shoes G'. The friction shoes G' and the wedge casing E' are substantially the same as the corresponding parts described in Figures 1 to 4, inclusive, the casing E being provided with interior wedge faces 41 cooperating with similar wedge faces 141 on the shoes G'. Each shoe is provided with an inner friction surface 42 slightly inclined with respect to the longitudinal axis of the mechanism and the friction surfaces 42 of the two shoes diverge rearwardly of the mechanism. The friction elements F' are provided with similarly inclined friction surfaces 142 which cooperate with the shoe friction surfaces. At the inner ends, the friction elements F' are provided with flat transverse end faces 43 adapted to co-operate with inwardly projecting lugs 44 on the friction shoes G', the lugs 44 cooperating with the friction elements F' to restore the latter to normal position. The parts are held assembled and of uniform overall length by the retainer bolts J' similar to the corresponding parts described in connection with Figures 1 to 4, inclusive.

In the operation of the embodiment of the invention disclosed in Figure 5, assuming a compression stroke of the mechanism, a wedging action will be set up between the friction shoes G' and the casing E' upon relative approach of the casing E' and the spring cage A'. Due to the wedging action, the shoes will be forced inwardly against the friction elements F' and the latter will be forced into tight frictional engagement with the friction post section D'. During the relative approach of the casing E' and the spring cage A', the friction shoes G' and the friction elements F' will be carried inwardly in unison until the inner ends of the friction elements come into abutment with the front edge of the spring cage. The movement of the friction elements F' in unison with the friction elements G' is due to the fact that the engaging faces of these elements are inclined with respect to the longitudinal axis of the mechanism, the friction between the interengaging surfaces of the friction elements F' and the shoes G' being greater than the friction between the interengaging surfaces of the friction post section and the elements F'. When movement of the friction elements F' is arrested, the friction shoes G' will be forced to slip on the friction surfaces of the elements F'. Due to the inclination of the interengaging friction surfaces of these parts, a differential action will also be effected, thereby causing slippage on the interengaging wedge faces of the wedge casing E' and the friction shoes G', which results in an additional compression of the main springs and greater ultimate capacity of the gear. The compression of the mechanism will continue until the inner end of the casing E' comes into engagement with the front end of the cage A' and the end wall of the casing E' engages the front end of the friction post section D' and the elements F', whereupon the actuating force will be transmitted through the casing E', elements F', post D' and spring cage A' directly to the stop lugs on the draft sills, these elements functioning as a solid column load transmitting member to prevent undue compression of the spring resistance elements.

When the actuating force is reduced during release, expansion of the springs H' will carry the shoes outwardly, thereby carrying the casing E' therewith. During the outward movement of the shoes G', the lugs thereof will come into engagement with the inner ends of the friction elements F', thereby restoring these parts to the normal position shown in Figure 5.

From the preceding description taken in connection with the drawings, it will be seen that I have provided a friction shock absorbing mechanism of exceptionally high ultimate capacity in which in the first form disclosed there are three stages of gradually increasing resistance, the first stage being a pure spring action followed by a second stage of frictional resistance, and a third stage of still higher frictional resistance, and in which in the second form there are two stages of increasing frictional resistance. A gear is thus provided which has a graduated blended action, thereby particularly adapting the same to absorb both relatively light and heavy shocks with equal facility.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a main follower; of a friction post; inwardly acting wedge means, said wedge means and main follower being relatively movable toward and away from each other; friction shoes co-operating with said wedge means; spring resistance means opposing relative movement of said shoes and main follower; movable friction elements interposed between the friction post and shoes; and means for arresting relative movement of the main follower and friction elements after a predetermined compression of the mechanism, thereby compelling relative movement of said shoes and friction elements during the remainder of the compression stroke.

2. In a friction shock absorbing mechanism, the combination with a main follower; of wedge means, said wedge means and follower being relatively movable toward and away from each other; a column element composed of relatively movable sections, one of said sections being provided with friction surfaces, and the other section being fixed with respect to said main follower; slidable friction elements co-operating with the friction surfaces of said first named column section; friction shoes co-operating with the friction elements; said shoes having wedge faces co-operating with the wedge means; a spring resistance means yieldingly opposing relative movement of the shoes and main follower; means for limiting relative movement of the main follower and friction elements after a predetermined compression of the mechanism to compel relative movement of the friction shoes and friction elements during the remainder of the compression stroke of the mechanism.

3. In a friction shock absorbing mechanism, the combination with a column element composed of relatively movable sections; of front and rear follower acting means relatively movable toward and away from each other, one of said follower means having wedge means thereon, and one of said column sections being movable in unison with the other follower acting means and the other section being normally spaced from the follower acting means having the wedge means thereon and adapted to be engaged by said follower acting means after a predetermined compression of the mechanism to be moved relatively to the other column section; friction elements co-operating with one of said sections; friction shoes co-operating with said friction elements, said shoes having wedging engagement with said wedge means; spring means yieldingly opposing movement of said friction shoes; and means for arresting inward movement of the friction elements after a predetermined compression of the mechanism to compel relative movement of the friction elements and shoes during the remainder of the compression stroke of the mechanism.

4. In a friction shock absorbing mechanism, the combination with relatively movable followers; of a movable friction post;

friction elements co-operating with the friction post, said elements and one of said followers having limited relative movement; friction shoes co-operating with the friction elements and movable relatively thereto; spring means opposing inward movement of the friction shoes and for restoring the same to normal position; and co-operating means on said shoes and post for restoring the latter to normal position upon release of the mechanism.

5. In a friction shock absorbing mechanism, the combination with a pair of relatively movable follower acting means, one of said means having wedge means thereon and the other follower acting means carrying a fixed post section; a floating post section having longitudinally disposed friction surfaces; a plurality of friction elements co-operating with the floating post; wedge shoes co-operating with the friction elements and having wedging engagement with the wedge means; spring resistance elements opposing movement of the friction shoes, the parts of the mechanism being so proportioned and arranged that the movable friction post section will engage one of said follower means and the fixed friction post section simultaneously with the engagement of the follower-acting means with each other, thereby providing a solid column load transmitting means to prevent undue compression of the spring resistance elements.

6. In a friction shock absorbing mechanism, the combination with movable main follower acting means, one of said means having lateral pressure creating means movable therewith; of a friction member having longitudinally disposed friction surfaces, said member being movable with said last named follower acting means; friction shoes co-operating with the lateral pressure creating means; movable friction elements interposed between the friction member and shoes; means for limiting inward movement of the friction elements after a predetermined compression of the mechanism to compel relative movement of said friction member, shoes and friction elements; and yielding means opposing inward movement of the friction shoes.

7. In a friction shock absorbing mechanism, the combination with relatively movable front and rear follower acting means; of a movable friction member normally slightly spaced from one of said follower acting means and adapted to be engaged and moved thereby after a predetermined compression of the mechanism; movable friction elements having their movement limited by engagement with the other follower means and co-operating with said friction member, said movable friction member being moved inwardly by the follower means engaging the same after movement of the friction elements has been arrested; friction shoes co-operating with the friction elements; spring means yieldingly opposing movement of the shoes; and means for forcing said friction shoes and friction elements against the friction member upon relative approach of said front and rear follower acting means.

8. In a friction shock absorbing mechanism, the combination with front and rear relatively movable follower acting means; of a floating friction member having longitudinally disposed friction surfaces, said member being slightly spaced from one of the follower acting means and adapted to be engaged thereby after a predetermined compression of the mechanism; wedge friction shoes having wedging engagement with said last named follower acting means; friction elements interposed between the shoes and friction member and having limited movement with respect to the other follower acting means, said friction shoes, friction member and friction elements being movable in unison during a predetermined portion of the compression stroke; means for limiting inward movement of said friction elements after a predetermined initial compression of the mechanism to compel movement of the friction shoes and friction member relatively to said friction elements.

9. In a friction shock absorbing mechanism, the combination with front and rear follower acting means, relatively movable toward and away from each other; of friction shoes having wedging engagement with one of said follower acting means; a floating friction member normally spaced from said last named follower acting means to provide for lost motion therebetween; a pair of friction elements interposed between the shoes and friction member; spring means opposing inward movement of the shoes, said friction shoes, elements and member being movable in unison during a predetermined portion of the compression stroke, thereby effecting a stage of pure spring resistance; means for arresting inward movement of the friction elements after said first stage of operation to compel relative movement of the friction shoes and elements during a second stage of operation of the mechanism, thereby producing increased resistance, the extent of lost motion between the friction member and the follower means co-operating therewith being of an extent to cause said follower means to engage the friction member after said second stage of operation to effect relative movement of the friction member and friction elements during the remainder of the compression stroke, thereby producing heavy friction resistance during the third stage of operation of the mechanism.

10. In a friction shock absorbing mechanism, the combination with a spring cage divided into two compartments by a central partition wall; of a set of twin arranged springs within the cage, one spring on each side of the partition wall, the interior walls of the cage and the side walls of the partition conforming to the contour of said springs to provide great column strength; a movable friction post adapted to engage said partition and have its movement limited thereby upon full compression of the mechanism; a main follower having interior wedge faces, said follower being adapted to engage and move said post; a pair of friction elements having lost motion with respect to the cage and adapted to engage the cage after a predetermined compression of the mechanism; friction shoes co-operating with the wedge faces of the main follower, said shoes having frictional engagement with the friction elements; and a spring resistance opposing inward movement of said shoes.

11. In a friction shock absorbing mechanism, the combination with a main follower; of a column element having longitudinally disposed friction surfaces; friction elements co-operating with said column element, said friction elements and main follower having limited relative movement; friction shoes, said shoes and friction elements having co-operating friction surfaces inclined to the longitudinal axis of the mechanism; means for forcing said shoes against the friction elements longitudinally of the mechanism, said means and main follower being relatively movable; means yieldingly opposing relative movement of said shoes and main follower; and means for limiting relative movement of the friction elements and main follower after a predetermined compression of the mechanism, thereby compelling relative movement of said shoes and friction elements during the remainder of the compression stroke.

12. In a friction shock absorbing mechanism, the combination with front and rear follower acting means relatively movable toward and away from each other; of a column element composed of relatively movable sections, one of said sections being movable with each follower acting means; friction elements co-operating with one of the column sections; means for limiting inward movement of said friction elements with respect to one of said follower means; means for limiting outward movement of the friction elements with respect to said last named follower means; friction shoes co-operating with the friction elements and having wedging engagement with the other follower means; and spring means yieldingly opposing movement of said shoes.

In witness that I claim the foregoing I have hereunto subscribed my name this 7th day of December, 1926.

STACY B. HASELTINE.